United States Patent Office 2,918,372
Patented Dec. 22, 1959

2,918,372

PROCESS FOR THE PRODUCTION OF A COFFEE EXTRACT IN THE FORM OF A DRY POWDER

Ronald Oliver Blench, White Plains, N.Y., assignor to E. Griffiths Hughes Limited, Salford, England, a corporation of Great Britain No Drawing. Application April 10, 1958
Serial No. 727,533

10 Claims. (Cl. 99—71)

The present invention relates to a process for the production of a coffee extract in the form of a dry powder.

A process of producing a soluble coffee has been proposed before which comprises the steps of solvent extracting fresh ground roasted coffee, fractionating the solvent extract by molecular distillation into separate aroma and fat constituents, hot water extracting the solvent extracted grounds and recombining aroma constituent fractions of the solvent extracted constituents with the hot water extracted constituents. This process results in a powder having a strong odor and consisting of extract particles coated with a film of aroma substances, which was found insufficient to obtain desirable results.

It is, therefore, one object of the present invention to provide a process for the production of a coffee extract in the form of a dry powder whereby an extract is obtained wherein the aroma is sealed inside the particles of dry powder and bringing about a powder which has only a faint but very agreeable coffee odor but not lacking in flavor.

It is another object of the present invention to provide a process for the production of a coffee extract in the form of a dry powder which comprises the steps of making from roasted and ground coffee an aqueous infusion containing aroma and flavor substances infused from the coffee, the addition to the infusion of suitable organic solvents and thereupon the desiccation of the infusion to obtain therefrom a coffee extract in the form of a powder.

The said solvents have preferably a boiling point below the temperature which the infusion reaches at the moment of creation of a dry powder therefrom. The infusion and the said solvents are homogenized before desiccation of the infusion and evaporation of the said solvents. The solvents may be, preferably, pure aliphatic petroleum distillate having a boiling point range of 36° C. to 45° C., chloroform, dichloroethylene, and others.

The essence of the present invention resides in an arrangement whereby the dispersion of the substance in the form of fine particles is brought about throughout the mass of coffee extract and the drying of the extract is achieved without taking any steps first to remove said substance, leading to a surprising result.

It is still another object of the present invention to provide a process for the production of a coffee extract in the form of a dry powder which comprises the removal of aroma and flavor substances from roasted and ground coffee, imparting of removed aroma and flavor substances to said suitable organic solvents, the preparation of an aqueous infusion from dearomatized and deflavored roasted and ground coffee, the mixing of the said suitable organic solvents with the infusion, and the desiccation of the mixture to produce a dry powder of a final temperature of about 80° C., the boiling point of the non-aqueous solvents being below 45° C. so that the said liquid is driven from the infusion and a coffee extract in the form of a powder of high aroma and flavor content and substantially or nearly completely free from said solvents is obtained.

In either of the said processes the desiccation is preferably effected by subjecting the mixture of infusion and said solvents to spray drying.

By means of either of the said processes, the presence of a satisfactory amount of aroma and flavor substances in the coffee extract in the form of a powder is obtainable without the use of additions or adulterants such as carbohydrates, oils, fats, sugars which are intended to retain or protect the aroma and flavor substances and remain mixed with and present in the coffee extract in the form of a powder, which can be seriously disadvantageous.

It has been discovered that, surprisingly, a high degree of retention of aroma and flavor is obtained when small amounts of an organic non-aqueous, water-immiscible, non-fatty liquid of very low boiling point and high volatility is introduced into the coffee infusion before spray drying, the boiling point of the liquid being below the maximum temperature of the spray during the short interval of time that drying is taking place. It appears to be difficult to understand why the said liquid does not rapidly evaporate without improving the retention of the coffee aroma and flavor substances. Nevertheless, the use of a small amount of aliphatic petroleum distillate, pentane, chloroform, dichloroethylene and others of very low boiling point, for example in the order of 2% to 2.8% by volume of the infusion to be desiccated has produced a remarkable improvement in the flavor of the dried extract in the form of a powder obtained from the infusion.

*Example 1*

One litre of aqueous infusion prepared from freshly roasted ground coffee by a known closed system extraction method and containing 20% of soluble coffee solids is shaken with 20 cubic centimeters of pure aliphatic petroleum distillate having a boiling point range of 36° C. to 45° C. The mixture is then homogenized and desiccated in a known spray dryer into which the mixture is introduced at approximately room temperature and in which the sprayed mixture meets hot air of about 200° C. to 250° C. The hot air evaporates the water from the mixture and powder falls to the bottom of the chamber of the spray dryer as is usual. Until the coffee solids are in dry powder form, the temperature of the spray remains low, for example at about 85° C. to 100° C. After the powder has become dry, the temperature of the particles thereof slowly rises until it reaches the outlet temperature, which is usually about 65° C. to about 90° C. About 254 grams of powdered extract is thus obtained of remarkably good aroma and flavor and a cup of beverage prepared by dissolving 1.5 grams of the powder in 150 cubic centimeters of hot water was similar in flavor to a normal cup of coffee beverage freshly made from the same type of coffee as that used in preparing the infusion.

*Example 2*

One litre of aqueous infusion prepared from freshly roasted ground coffee by a known closed system extraction method and containing 20% of soluble coffee solids is shaken with 20 cubic centimeters of chloroform. The additional steps to be performed are identical with those disclosed in Example 1 leading to a satisfactory product.

*Example 3*

One litre of aqueous infusion prepared from freshly roasted ground coffee by a known closed system extraction method and containing 20% of soluble coffee solids is shaken with 20 cubic centimeters of chloroethylene. The additional steps to be performed are identical with those disclosed in Example 2 leading to a satisfactory product.

By the use of a solvent such as pure aliphatic petroleum distillate, chloroform, dichloroethylene and others, having a very low boiling point, it is ensured that appreciably no residue of the solvent remains in the coffee extract in the form of a dry powder thus produced and, therefore, that no adulterant is present in the extract in the form of a dry powder. Before the complete disappearance of the solvent from the extract it creates conditions which lead to the aroma and flavor substances being retained within the mass of the particles of the extract during and after desiccation.

Although other solvents can be used, it is preferred to use aliphatic petroleum distillate, such as that hereinbefore stated because for commercial operation it is cheap and the cost of the solvent used is not so great as to make the process uneconomic. Furthermore, the use of such a solvent does not involve any risk of retention of toxic substances in the powder, as experienced with some solvents. Also because the solvent is of such low boiling point more of it can be used without risk of its being retained in the powder and hence better coffee aroma retention can be achieved than with solvents of higher boiling point. Indeed it is found that the degree of coffee aroma retention is not related to the boiling point of the solvent used. Yet, the higher the boiling point of the solvent, the more of it will be retained or absorbed in the powder. Heating with or without vacuum, to remove these solvent traces, will remove simultaneously some aroma and flavor substances.

One important feature of the invention is the use of a solvent, as indicated in the examples, having a boiling point below the maximum temperature reached by the sprayed liquid before the completion of the desiccation, i.e. below the temperature of the dry particles at the moment when they are formed and begin to be carried out through the chamber.

In a variant of this procedure coffee aroma substances may be separated from coffee or a coffee infusion by distillation or by extraction with a non-aqueous solvent in which the flavor and aroma substances are soluble or by passing an inert gas, as nitrogen or carbon dioxide, through the dry mass of coffee and collecting the volatile aroma substances in a suitable solvent and this may then be mixed with the coffee infusion and homogenized with it before drying. For instance, the infusion may be prepared from coffee which has previously had the greater part of its aroma substances removed in such a manner and the organic solvent may be a vehicle used for restoring the aroma substances to the extract to give a complete aromatized coffee extract. Such methods are also effective from the point of view of aroma and flavor retention.

This method may be performed, by example, by passing a slow current of nitrogen through a vessel filled with roasted coffee immersed in a vessel filled with, say, ethylene glycol at 230° C., or heated to this temperature by steam under pressure. The aroma-laden nitrogen emerging from the coffee is fed to the solvent where aroma, etc., is stripped out. The solvent is kept cool.

While I have disclosed several embodiments of the present invention, it is to be understood that these embodiments are given by example only and not in a limiting sense, the scope of the present invention being determined by the objects and the claims.

I claim:

1. A process for the production of a dry coffee extract in the form of a powder, comprising the steps of making from roasted and ground coffee an aqueous infusion containing aroma and flavor substances infused from said coffee, adding of a material selected from the group consisting of aliphatic petroleum distillate, chloroform and dichloroethylene to said infusion, thereupon desiccating said infusion while containing said material in order to obtain therefrom a coffee extract in the form of a dry powder, and separation of said material from said extract.

2. A process for the production of a coffee extract in the form of a dry powder, comprising the steps of making from roasted and ground coffee an aqueous infusion, adding of a material selected from the group consisting of aliphatic petroleum distillate, chloroform and dichloroethylene to said infusion, homogenizing of the mixture composed of said infusion and said material, and desiccating said infusion and evaporating said material.

3. A process for the production of a coffee extract in the form of a dry powder, comprising the steps of making from roasted and ground coffee an aqueous infusion, mixing of pure aliphatic petroleum distillate having a boiling point not exceeding about 45° C. with said infusion, subjecting the mixture of said distillate and said infusion to a desiccating treatment in order to obtain therefrom a coffee extract in the form of a dry powder, and separation of said distillate from said extract.

4. A process for the production of a coffee extract in the form of a dry powder, comprising the steps of making from roasted and ground coffee an aqueous infusion, mixing of chloroform with said infusion, subjecting the mixture of said chloroform and said infusion to a desiccating treatment in order to obtain therefrom a coffee extract in the form of a dry powder, and separation of said chloroform from said extract.

5. A process for the production of a coffee extract in the form of a dry powder, comprising the steps of making from roasted and ground coffee an aqueous infusion, mixing of dichloroethylene with said infusion, subjecting the mixture of said dichloroethylene and said infusion to a desiccating treatment in order to obtain therefrom a coffee extract in the form of a dry powder, and separation of said dichloroethylene from said extract.

6. A process for the production of a coffee extract in the form of a dry powder, comprising the steps of making from roasted and ground coffee an aqueous infusion, mixing of pure petroleum distillate having a boiling point range of 36° C. to 45° C. with said infusion, desiccating said mixture by heat to obtain therefrom a coffee extract in the form of a dry powder, upon heating the latter to a higher temperature during said desiccation treatment than said boiling point of said distillate.

7. A process for the production of a coffee extract in the form of a dry powder, comprising the steps of imparting of coffee aroma and coffee flavor substances to a material selected from the group consisting of aliphatic petroleum distillate, chloroform and dichloroethylene, preparing an aqueous infusion from dearomatized and deflavored roasted and ground coffee, mixing said material with said infusion, and desiccating the mixture of said material and said infusion in order to produce a dry powder at a final temperature of about 80° C.

8. A process for the production of a coffee extract in the form of a dry powder, comprising the steps of making from roasted and ground coffee an aqueous infusion, adding of a material selected from the group consisting of aliphatic petroleum distillate, chloroform and dichloroethylene, to the infusion in order to produce a mixture, heating said mixture increasingly to about 65° C. to 85° C. for the spray drying thereof until a coffee extract in the form of a dry powder is produced.

9. A process for the production of a coffee extract in the form of a dry powder, comprising the steps of making from roasted and ground coffee an aqueous infusion, adding to said infusion of 2% to 2.8% by volume of a material selected from the group consisting of aliphatic petroleum distillate, chloroform and dichloroethylene, subjecting said infusion, while still admixed with the said material, to desiccation during which the solid matter of said mixture is raised to a temperature of about 90° C.

10. A process for the production of a coffee extract in the form of a dry powder, comprising the steps of making from roasted and ground coffee of one litre of an aqueous infusion containing 20% of soluble coffee solids, shaking the same with 20 cubic centimeters of pure aliphatic petroleum distillate having a boiling point range of 36° C. to 45° C., homogenizing the mixture of the latter with coffee solids, and desiccating said mixture by spray drying by hot air at about 200° C. to 250° C. commenced when said mixture is approximately at room temperature, the temperature of said mixture remaining at about 50° C. to 60° C. until the water of said infusion has evaporated therefrom and releasing a powder the temperature of which rises to about 65° C. to about 85° C.

References Cited in the file of this patent

UNITED STATES PATENTS

| | | |
|---|---|---|
| 1,123,827 | Whitaker et al. | Jan. 5, 1915 |
| 1,925,159 | Wendt | Sept. 5, 1933 |
| 2,563,233 | Gilmont | Aug. 7, 1951 |